US009357366B2

(12) United States Patent
Seolas et al.

(10) Patent No.: US 9,357,366 B2
(45) Date of Patent: May 31, 2016

(54) AUDITING OF MOBILE APPLICATIONS
(71) Applicant: OBSERVEPOINT, LLC, Provo, UT (US)
(72) Inventors: Robert K. Seolas, Alpine, UT (US); John Pestana, Orem, UT (US); Tyler Broadbent, Lehi, UT (US); Alan Martin Feuerlein, Orem, UT (US)
(73) Assignee: OBSERVEPOINT, INC., Provo, UT (US)
( * ) Notice: Subject to any disclaimer, the term of this patent is extended or adjusted under 35 U.S.C. 154(b) by 0 days.
(21) Appl. No.: 14/485,539
(22) Filed: Sep. 12, 2014
(65) Prior Publication Data
US 2016/0080918 A1    Mar. 17, 2016
(51) Int. Cl.
*H04W 4/20* (2009.01)
*H04L 12/26* (2006.01)
*H04W 24/08* (2009.01)
(52) U.S. Cl.
CPC ............... *H04W 4/20* (2013.01); *H04L 43/045* (2013.01); *H04W 24/08* (2013.01)
(58) Field of Classification Search
CPC .......... G06F 17/2247; G06F 17/30899; H04L 67/02; H04L 43/045; H04W 4/20; H04W 24/08
See application file for complete search history.

(56) References Cited

U.S. PATENT DOCUMENTS

| | | | |
|---|---|---|---|
| 6,792,458 B1 | 9/2004 | Muret | |
| 6,804,701 B2 | 10/2004 | Muret | |
| 7,610,289 B2 | 10/2009 | Muret | |
| 7,849,202 B2 | 12/2010 | Muret | |
| 8,032,564 B2 | 10/2011 | Muret | |
| 8,150,983 B2 | 4/2012 | Muret | |
| 8,261,362 B2 | 9/2012 | Goodwin | |
| 8,401,172 B1 | 3/2013 | Duva | |
| 8,429,243 B1 | 4/2013 | Wang | |
| 8,516,601 B2 | 8/2013 | Goodwin | |
| 8,538,458 B2 | 9/2013 | Haney | |
| 8,554,804 B2 | 10/2013 | Muret | |
| 8,640,037 B2 | 1/2014 | Goodwin | |
| 8,683,051 B2 | 3/2014 | Muret | |
| 8,683,056 B2 | 3/2014 | Muret | |
| 8,805,946 B1 | 8/2014 | Gommen | |
| 8,843,827 B2 | 9/2014 | Koo | |
| 8,904,278 B1 | 12/2014 | Anderson | |
| 8,990,298 B1 | 3/2015 | Anderson | |
| 8,996,986 B2 | 3/2015 | Manion | |
| 8,997,081 B1 | 3/2015 | Manion | |
| 9,003,552 B2 | 4/2015 | Goodwin | |
| 9,081,789 B2 | 7/2015 | Anderson | |
| 9,116,608 B2 | 8/2015 | Koo | |
| 9,165,308 B2 | 10/2015 | Cook | |
| 9,185,016 B2 | 11/2015 | Muret | |
| 9,203,905 B1 | 12/2015 | Hong | |
| 9,219,787 B1 | 12/2015 | Manion | |
| 2006/0168334 A1* | 7/2006 | Potti | H04L 67/1008 709/239 |
| 2007/0005786 A1* | 1/2007 | Kumar | G06F 8/67 709/230 |
| 2007/0283194 A1* | 12/2007 | Villella | G06F 11/3476 714/57 |
| 2008/0114875 A1 | 5/2008 | Anastas | |
| 2009/0287713 A1 | 11/2009 | Anderson | |
| 2011/0119220 A1* | 5/2011 | Seolas | G06F 17/30899 706/47 |
| 2011/0246298 A1 | 10/2011 | Williams | |
| 2013/0290480 A1 | 10/2013 | Manion | |
| 2013/0297775 A1 | 11/2013 | Hong | |
| 2013/0297776 A1 | 11/2013 | Hong | |
| 2013/0297777 A1 | 11/2013 | Hong | |
| 2013/0297778 A1 | 11/2013 | Hong | |
| 2014/0041048 A1 | 2/2014 | Goodwin | |
| 2014/0089782 A1 | 3/2014 | Cook | |
| 2014/0137006 A1 | 5/2014 | Goodwin | |
| 2014/0156738 A1 | 6/2014 | Muret | |
| 2014/0208216 A1 | 7/2014 | Koo | |
| 2015/0066587 A1 | 3/2015 | Glommen | |
| 2015/0213282 A1 | 7/2015 | Goodwin | |
| 2015/0295988 A1 | 10/2015 | Goodwin | |
| 2016/0004673 A1 | 1/2016 | Cook | |

OTHER PUBLICATIONS

International Search Report and Written Opinon PCT/US2014/062056 mailed Feb. 6, 2015.

* cited by examiner

*Primary Examiner* — Kashif Siddiqui
(74) *Attorney, Agent, or Firm* — Workman Nydegger (57) ABSTRACT

A method for auditing tags launched within a target mobile application comprises analyzing a network communication generated by a target mobile application to determine if an identifiable tag signature is present within the network communication. An identifiable tag signature can comprise one or more attributes that are associated with the firing of a tag. Based upon a detected tag signature, the method can further comprise determining that a particular tag fired. Further the method can comprise recording information associated with the particular tag.

20 Claims, 6 Drawing Sheets

Audit Report  300

Application: XYZ webportal  ⎯310

320⎯ Loaded content: www.XYZ.com/content#1

Total # of expected tags: 4 ⎯330
Total # of detected tags: 3 ⎯340

Loaded content: www.XYZ.com/content#2

Total # of expected tags: ...

AUDITING OF MOBILE APPLICATIONS

BACKGROUND OF THE INVENTION

1. The Field of the Invention

This invention relates to systems, methods, and computer program products related to analysis of mobile applications.

2. Background and Relevant Art

Mobile devices, such a tablet computers and smart phones, have experienced explosive growth and market penetration in recent years. Accompanying this growth, the mobile application market has also experienced tremendous growth. Mobile applications can range from simple games to complex productivity software. In many cases, regardless of the type of mobile application, the mobile application communicates through the Internet to various servers. The servers can be used to store user created content, provide additional features, allow a developer to track software and user behavior, or provide other similar services.

As an exemplary mobile application, a newspaper may create a dedicated mobile application for accessing content on its webpage. For example, a newspaper may create a mobile application that acts as a web portal to its standard webpage. Using the mobile application, a user can easily navigate the newspaper's content. In some conventional systems, the mobile application may provide a user experience that is very similar to the user experience provided through a general purpose mobile web browser.

Similar to webpages that are accessed through conventional computer-based web browsers, the content viewable by the mobile application may comprise various pieces of code, sometimes referred to as "tags," that are configured to execute (i.e., "fire") when the content is viewed. In at least one conventional form, a tag is a hidden element within a webpage that causes some action to occur on a webpage when it is fired. In particular, in at least one implementation, a tag is a piece of code that a webpage owner can place within a webpage, and allows the webpage owner to track information about the visitors who download and execute the particular piece of code.

For example, a tag can comprise a transparent GIF or a tracking pixel, which is placed within the code of a webpage. The actual transparent GIF or tracking pixel can be stored on a separate server from the actual webpage. The tag is fired when the browser requests the transparent GIF or tracking pixel from the separate server. When the separate server receives the request from the browser, the server can gather various analytic data about the requestor.

Once executed, a tag can gather information such as where the visitor came from (e.g., what webpage or search engine), what keywords were used to find the webpage, whether a particular advertisement directed a visitor to the page, and other related data. In many situations, a webpage can comprise multiple tags from a variety of different parties. For example, a particular webpage may contain a Google Analytics tag, a Facebook tag, a page-counter Tag, a weather tag, and other common tags. In at least one implementation, a tag can merely comprise a particular call to an external advertising server.

As mobile applications have become more pervasive and as more user have begun to access web-based content through custom mobile applications, content providers have also become more interested in ensuring that the various tags embedded within their web content are operating correctly within the mobile applications. In many cases, large amounts of advertising money are dependent upon tags correctly tracking visitors to a website.

Auditing mobile applications, however, presents several unique challenges. For example, due to the tremendous variety of mobile applications it is much more difficult to create a "standard" test environment. Additionally, many organizations create a mobile version of their web content, such that audits of their conventional web-based content do not necessarily correlate to audits of their mobile content.

Accordingly, there are a number of problems in the art relating to auditing web-based content that is accessed through mobile applications.

BRIEF SUMMARY OF THE INVENTION

Implementations of the present invention provide systems, methods, and computer program products configured to audit tags within mobile applications. In at least one implementation, a network communication from a particular mobile application is directed through an audit server. The audit server can then determine what tags are fired within the particular mobile application. Additionally, in at least one implementation of the auditing system, the mobile application can be executed within an application interface layer on a desktop computer. The application interface layer can comprise an emulator, a simulator, or a similar layer. The application interface layer can detect the tags that are fired within the mobile application. After auditing a mobile application, the auditing system can generate a report to a user of interest.

For example, at least one implementation of the present invention comprises a method of the mobile auditing application auditing tags launched within a target mobile application. The method includes intercepting, with the mobile auditing application, a network communication. The network communication can originate from the target mobile application. Additionally, the mobile auditing application and the target mobile application can both be installed on the mobile device. The method can further comprise analyzing the network communication to determine if an identifiable tag signature is present within the network communication. An identifiable tag signature can comprise one or more attributes that are associated with the firing of a tag. Based upon a detected tag signature, the method can further comprise determining that a particular tag fired. Further the method can comprise recording information associated with the particular tag.

At least one implementation of the present invention comprises an additional method of the mobile auditing application auditing tags launched within a target mobile application. The method includes directing, through a proxy server, a network communication, wherein the network communication originates from a target mobile application installed on a mobile device. The method can further comprise analyzing the network communication to determine if an identifiable tag signature is present within the network communication. An identifiable tag signature can comprise one or more attributes that are associated with the firing of a tag. Based upon a detected tag signature, the method can further comprise determining that a particular tag fired. Further the method can comprise recording information associated with the particular tag.

Additionally, at least another implementation of the present invention comprises a method of the mobile auditing application auditing tags launched within a target mobile application. The method includes intercepting, with the application interface layer, a network communication. The network communication can originate from the target mobile application. The application interface layer may be installed on a desktop computer. The target mobile application may be installed within the application interface layer. Additionally, the target mobile application may behave as if it is installed on a mobile device.

The method can further comprise analyzing the network communication to determine if an identifiable tag signature is present within the network communication. An identifiable tag signature can comprise one or more attributes that are associated with the firing of a tag. Based upon a detected tag signature, the method can further comprise determining that a particular tag fired. Further the method can comprise recording information associated with the particular tag.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention extend to systems, methods, and computer program products configured to audit tags within mobile applications. In at least one implementation, a network communication from a particular mobile application is directed through an audit server. The audit server can then determine what tags are fired within the particular mobile application. Additionally, in at least one implementation of the auditing system, the mobile application can be executed within an application interface layer on a desktop computer. The application interface layer can comprise an emulator, a simulator, or a similar layer. The application interface layer can detect the tags that are fired within the mobile application. After auditing a mobile application, the auditing system can generate a report to a user of interest.

Accordingly, implementations of the present invention provide improvements within the technical field of mobile computer software auditing. For example, implementations of the present invention can provide a mobile software developer with a previously unavailable system for auditing mobile software applications for proper tag firing. Additionally, various implementations of the present invention provide flexible systems for auditing a mobile software application as the software is executed on the mobile platform or within a desktop computer-based emulator or simulator.

One of skill in the art will appreciate the benefit that implementations of the current invention provide. In particular, in a digital world increasingly interconnected, the ability to verify that tags are properly firing can have significant impacts on revenue and product development. For example, a significant amount of web content is supported by advertising-related payments. In order to properly track the number of visitors, and the associated advertising costs, tags must be properly configured to fire. If content is being provided through dedicated applications, and the tags are not firing, a significant amount of advertising revenue may be lost.

Figure 1:
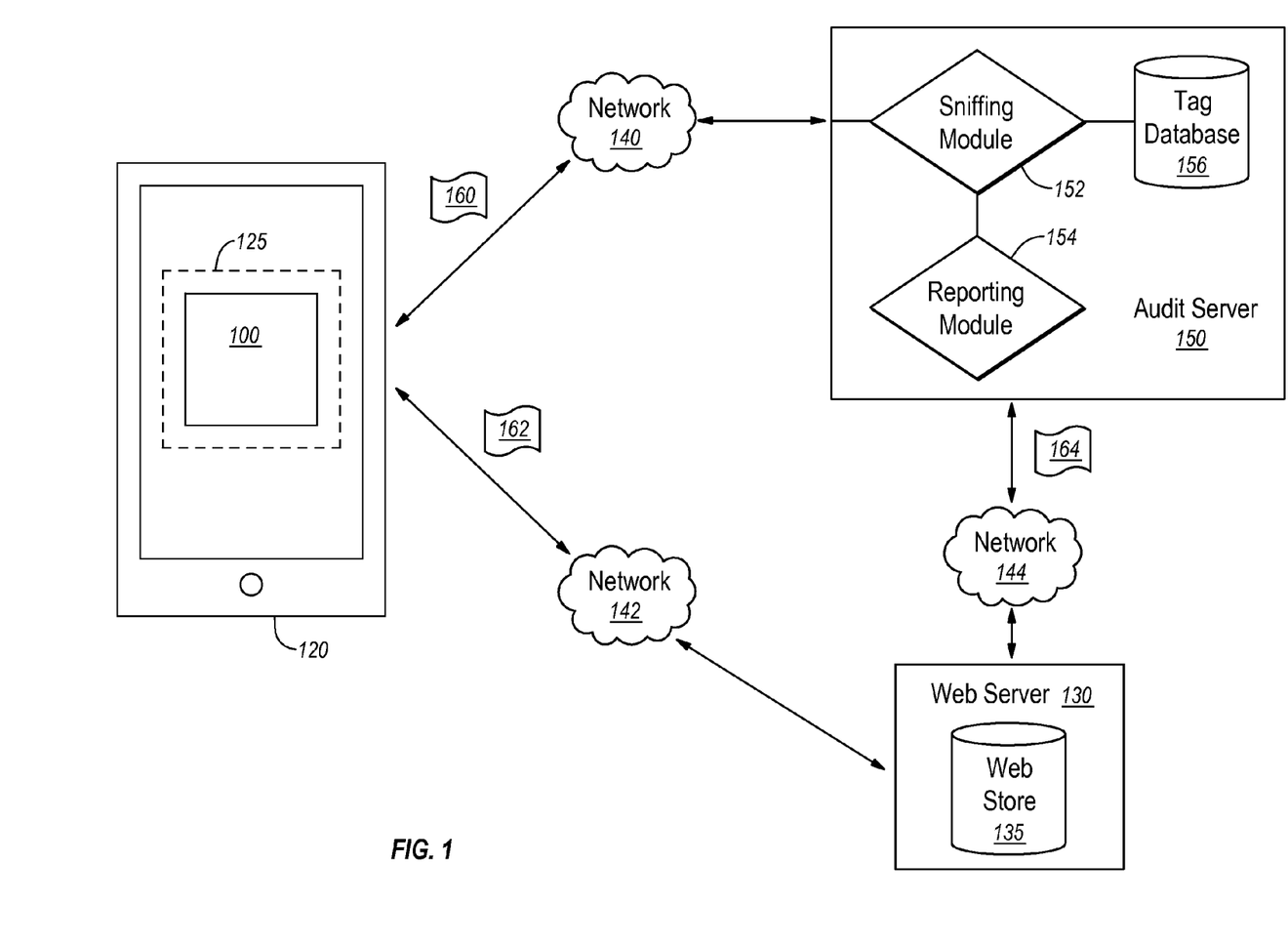
FIG. 1 illustrates an overview schematic diagram of a system for use in accordance with one or more implementations of the present invention.

For example, FIG. 1 illustrates an overview schematic diagram of a system for use in accordance with one or more implementations of the present invention. In particular, FIG. 1 depicts a mobile device 120 that comprises at least one mobile application 100. The at least one mobile application 100 may be configured to access web content from a particular content provider. For example, the at least one mobile application 100 may comprise a portal to a particular news site. As such, the mobile application may allow a user to access web content from the news provider. Additionally, the mobile device 100 can also be in communication with various servers 130, 150 through network connections 140, 142.

In at least one implementation, the mobile device 100 may also comprise a mobile auditing application 125 that is also installed on the mobile device 100. The mobile auditing application 125 can be configured to intercept network communications that originate from the at least one mobile application 100 ("target mobile application"). The mobile auditing application 125 can intercept the network communications of the target mobile application 100 through a variety of different techniques. For example, the mobile auditing application 125 can comprise an application layer positioned between the target mobile application 100 and the hardware of the mobile device 120. In this configuration, the mobile auditing application 125 can intercept network communications that originate from the target mobile application 100 as they are generated by the application 100.

Additionally, in at least one implementation, the mobile auditing application 125 can detect an indication of a user input within the target mobile application 100. Additionally, the mobile auditing application 125 can further determine that a tag firing is expected in response to the detected user input. For example, the mobile auditing application 125 may detect an indication of the user executing a video within the target mobile application 100. The executed video may be associated with an expected tag. Accordingly, the mobile auditing application 125 can send a notification to audit server 150 to watch for the expected tag.

In at least one implementation, the mobile auditing application 125 can function independent of an audit server 150. For instance, the mobile auditing application 125 can intercept and analyze the network communications all from within the mobile device 120. As such, the disclosure relating to the audit server 150 provided below can all be applied to functions performed by the mobile auditing application 125 within the mobile device 120.

In an alternative implementation, the mobile auditing application 125 can configure settings on the mobile device 120 so that the mobile device 120 communicates through a proxy server (e.g., audit server 150). In at least one implementation, a mobile auditing application is not necessary, and a user can instead manually adjust the settings of the mobile device 120 to communicate through the proxy server.

In the above cases, a network communication 160 originating from the target mobile application 100 is sent through a network connection 140 to an audit server 150 (i.e., proxy server). The audit server 150 can analyze the network communication 160 for the desired tag attributes. Before or after analyzing the network communication 160, the audit server 150 can forward the network communication 164 through a network connection 144 to the originally addressed Web server 130. The Web server 130 can then serve content from its web store 135 back to the target mobile application 100 either through network connection 144 and the audit server 150 or through a direct network connection 142 (network communication 162) to the mobile communication device 120.

Returning to audit server 150, when the audit server 150 receives a network communication 160 from the target mobile application 100 the sniffing module 150 analyzes the network communication 160 to determine if the network communication 160 comprises an indication of a tag firing. In at least one implementation, the sniffing module 152 identifies tags within the network communication 160 through the use of tag signatures. Tag signatures can comprise various attributes that are associated with groups of tags, types of tags, and specific tags. For example, a particular tag may comprise specific elements within its associated URL. For example, the sniffing module 152 can detect the particular text portions within the URL, or it can detect the server that the URL is directed towards. Either of these pieces of information may assist in identifying a particular tag.

The tag database 156 may comprise a repository of various tag signatures. Relying upon the tag database 156, the sniffing module 152 can analyze network communication 160 and identify a variety of tag signatures. In at least one implementation, a user can upload new tag signatures to the tag database 156. Additionally, a user may be able to select specific tags that the sniffing module 152 should identify.

As the sniffing module 152 analyzes network communication 160, the reporting module 154 can generate reports based upon the detected tags. In at least one implementation, reporting module 154 may also be aware of expected tag firings. Information related to the expected tag firings may be provided by a developer of the target mobile application 100, by an associated advertiser, or by some other related party. Using the information of expected tag firings, reporting module 154 can also report on expected tags that did not fire. Reporting module 154 can provide its report through the mobile auditing application 125, through another application installed on an external system, or through any other of a number of means of receiving a report.

In at least one implementation, the reporting module 154 may provide a summary of the detected tag signatures and/or a detailed accounting of all of the tag information. For example, a summary may comprise the identified tags, the tags that were expected to fire, and a brief overview of information about each tag. In contrast, the detailed accounting may comprise specific URLs that were requested, uncategorized tags, times that the tags fired, information that the tags contained, variables associated with the tags, and other similar information.

Figure 2:
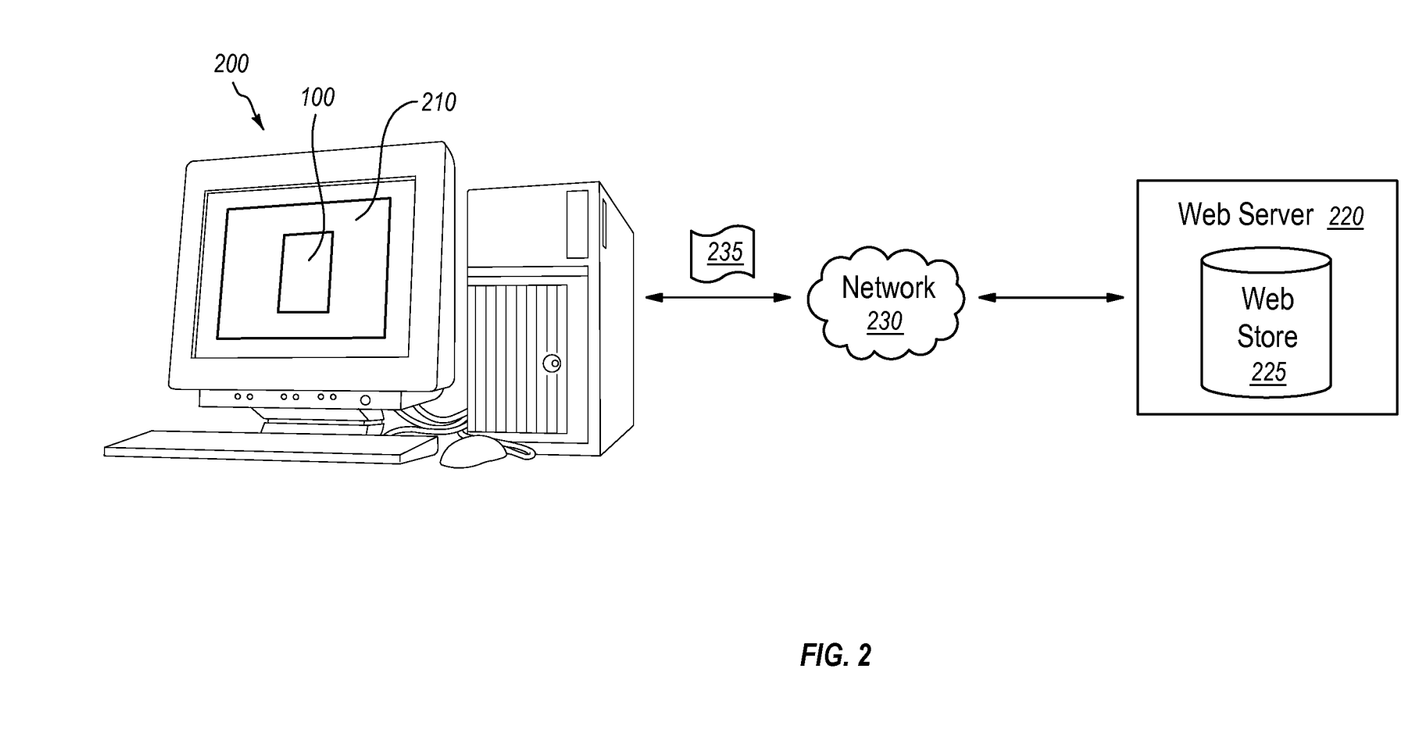
FIG. 2 illustrates an overview schematic diagram of another system for use in accordance with one or more implementations of the present invention.

Turning now to FIG. 2, FIG. 2 illustrates an overview schematic diagram of another system for use in accordance with one or more implementations of the present invention. In particular, FIG. 2 depicts a desktop computer that is executing an application interface layer 210. The application interface layer 210 may comprise an emulator or a simulator configured to substantially replicate the function of a mobile device 120. For example, the application interface layer 210 may be able to execute mobile applications 100 that are configured to execute on mobile devices 120. Accordingly, in at least one implementation, a user can execute a target mobile application 100 within the application interface layer 210 on a desktop computer 200. As used herein, a desktop computer 200 can include a laptop computer, a tablet computer, a server, a workstation, a mainframe, or any other computer capable of running an application interface layer 210 as disclosed herein.

In at least one implementation, when a user executes a target mobile application 100 within the application interface layer 210, the application interface layer 210 can intercept network communications 235 that are generated by the target mobile application 100. The intercepted network communications 235 can either be analyzed by the application interface layer 210 or forwarded to an audit server 150 to be analyzed as disclosed above. In either case, the network communications 235 are eventually forwarded on to the intended Web server 220 through network connection 230. As such, either an audit server 150 or an application interface layer 210 can identify tags that are associated with the network traffic of a target mobile application 100.

Allowing a developer to audit a target mobile application 100 within an application interface layer 210 can provide several benefits. For example, an application interface layer 210 allows a developer to test code while it is being written on the desktop computer 200. As such, a developer would not be required to first build and compile a code base, transmit the code base to a mobile device 120, execute the code base on the mobile device 120, review the audit report, and then make the necessary adjustments to the code base. Instead, the application interface layer 210 allows a user to both develop and test the code within the same platform 200.

Additionally, an application interface layer 210 can also be beneficial due to its ability to easily gather input and output generated by the target mobile application 100. Because the application interface layer 200 is aware of the entire target mobile application 100, the application interface layer 210 can identify expected tag firing and detected tag firings in substantially real-time.

For example, the application interface layer 210 can identify that the target mobile application 100 is accessing a particular webpage on a particular website. The application interface layer 210 can access within a database, stored either on the desktop computer 200 or on a remote storage device, the particular tags that are associated within the particular website. The application interface layer 210 can then identify the inputs that are provided to the target mobile application 100, and based upon the identified inputs determine the expected tags. As disclosed above, the application interface layer 210 and/or and audit server 150 can then determine which of the expected tags fired, which tags failed to fire, which tags fired incorrectly, and which tags fired that were not expected.

Similar to the methods disclosed above, the tags can be identified using tag signatures. The identification can occur at the desktop computer 200 or at an external audit server 150. In either case, a report can be generated (e.g., by the auditing server 150) that provides information relating to the tags. The report can comprise a summary of tags detected, tags expected, and type of tags. Additionally, a detailed accounting can provide specific information relating to the tags, when the fired, what information they contained, and other similar information.

Figure 3:
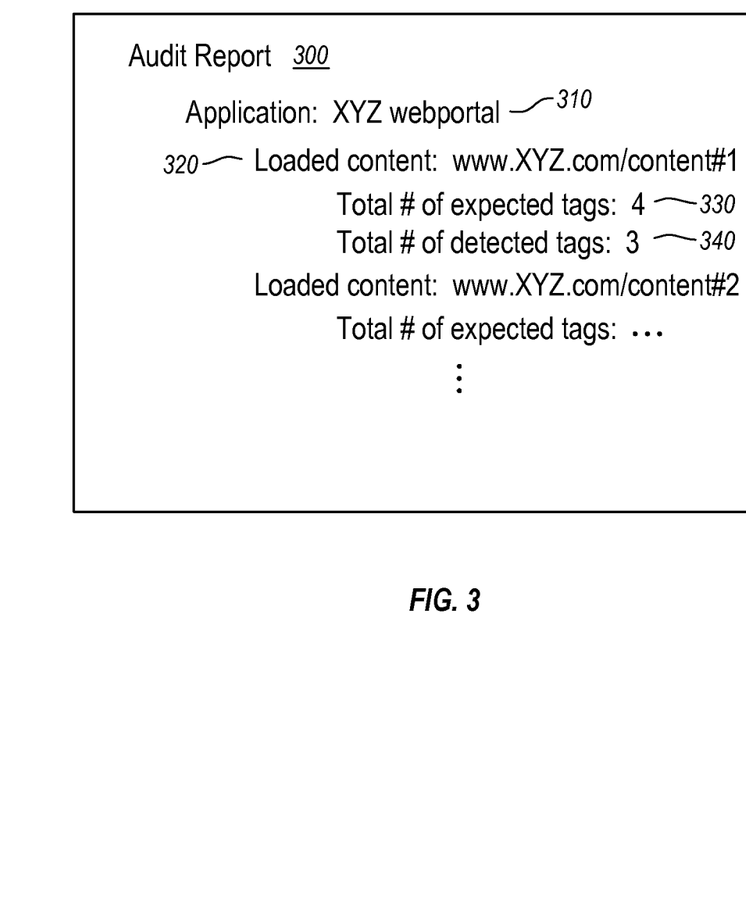
FIG. 3 illustrates an exemplary user interface for reporting an audit in accordance with an implementation of the present invention.

For example, FIG. 3 illustrates an exemplary user interface for reporting an audit in accordance with an implementation of the present invention. In particular, FIG. 3 depicts an audit report 300 that comprises a summary of an audit. The audit report 300 shows an indication of the target application 310. Additionally, the audit report 300 comprises an indication of the web content 320 that was requested by the target mobile application. Associated with each requested web content page 320, the audit report can also comprise an indication of a number of expected tags and the number of actually detected tags.

In at least one implementation, additional information can be available in a detailed account. For example, the detailed accounting can comprise information relating to the specific tags that fired, the URLs that were requested, the timing of the tags, and other similarly related information.

Figure 5:
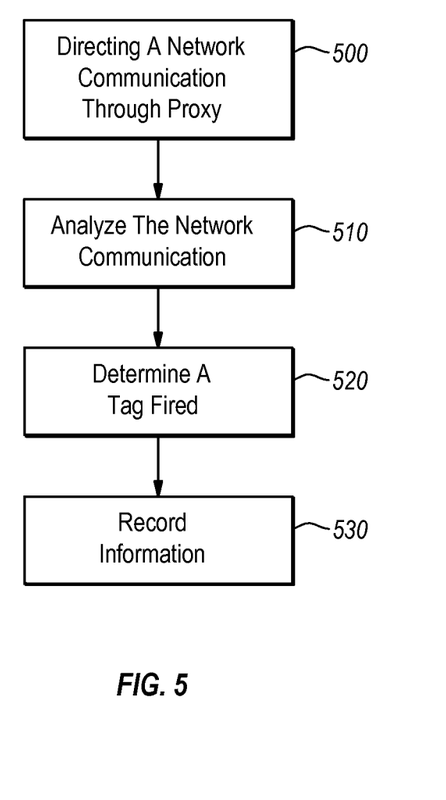
FIG. 5 illustrates a flowchart of another method in accordance with an implementation of the present invention of auditing mobile applications.
Figure 6:
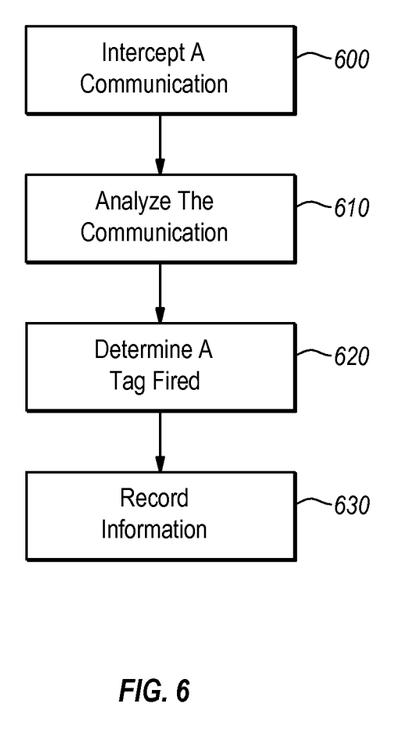
FIG. 6 illustrates a flowchart of yet another method in accordance with an implementation of the present invention of auditing mobile applications.

Accordingly, FIGS. 1-3 and the corresponding text illustrate or otherwise describe one or more components, modules, and/or mechanisms for auditing mobile applications. In particular, in at least one implementation, the present invention can audit a mobile application using an external server through which network communications are redirected. Additionally, in at least one implementation of the present invention, the mobile applications can be audited locally either on a mobile device or within an application interface layer on a desktop computer. One will appreciate that implementations of the present invention can also be described in terms of flowcharts comprising one or more acts for accomplishing a particular result. For example, FIGS. 4-6 and the corresponding text describe acts in a method for auditing mobile applications. The acts of FIGS. 4-6 are described below with reference to the elements shown in FIGS. 1-3.

Figure 4:
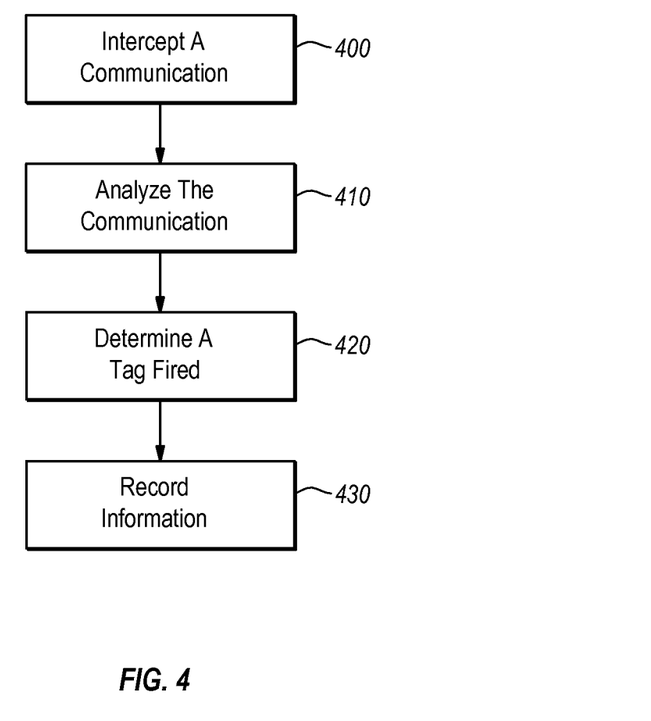
FIG. 4 illustrates a flowchart of a method in accordance with an implementation of the present invention of auditing mobile applications.

For example, FIG. 4 illustrates that a method for auditing mobile applications can include an act 400 of intercepting a communication. Act 400 can comprise intercepting, with a mobile auditing application, a network communication. The network communication can originate from the target mobile application. Additionally, the mobile auditing application and the target mobile application can both be installed on the mobile device. For example, in FIG. 1, the target mobile application 100 can generate a network communication 160. The network communication 160 can be intercepted by mobile auditing application 125.

FIG. 4 shows that the method can also include act 410 of analyzing the communication. Act 410 can comprise analyzing the network communication to determine if an identifiable tag signature is present within the network communication. An identifiable tag signature can comprise one or more attributes that are associated with the firing of a tag. For example, in FIG. 1, mobile auditing application 125 can analyze network communication 160. In particular, the mobile auditing application 125 either analyze network communication 160 locally on the mobile device 120 or send the network communication to audit server 150, where the sniffing module 152 can identify various attributes relating to the network communication 160.

Additionally, FIG. 4 shows that the method can include act 420 of determining that a tag fired. Act 420 can comprise, based upon a detected tag signature, determining that a particular tag fired. For example, in FIG. 1, the mobile auditing application 125 can identify various attributes relating to network communication 160. The mobile auditing application 125 can compare these attributes to tag signatures stored in a database accessible to the mobile auditing application 125. Based upon this comparison, mobile auditing application 125 can determine that a particular tag fired.

FIG. 4 also shows that the method can comprise act 430 of recording information. Act 430 includes recording information associated with the particular tag. For example, FIG. 3 depicts a summary report that can be generated by the mobile auditing application 125.

As an additional or alternative implementation, FIG. 5 shows that a method for auditing mobile applications can include act 500 of directing a network communication through a proxy. Act 500 can comprise directing, through a proxy server, a network communication. The network communication can originate from a target mobile application installed on a mobile device. For example, in FIG. 1, network communication 160 is redirected from webserver 130 such that it first passes through audit server 150. Audit server 150 can analyze network communication 160 with sniffing module 152. In particular, the sniffing module 152 can identify various attributes relating to the network communication 160.

FIG. 5 shows that the method can also include act 510 of analyzing the communication. Act 510 can comprise analyzing the network communication to determine if an identifiable tag signature is present within the network communication. An identifiable tag signature can comprise one or more attributes that are associated with the firing of a tag. For example, in FIG. 1, audit server 150 can analyze network communication 160 with sniffing module 152. In particular, the sniffing module 152 can identify various attributes relating to the network communication 160.

Additionally, FIG. 5 shows that the method can include act 520 of determining a tag fired. Act 520 can comprise, based upon a detected tag signature, determining that a particular tag fired. For example, in FIG. 1, the sniffing module 152 can identify various attributes relating to network communication 160. The sniffing module 152 can compare these attributes to tag signatures stored in the tag database 156. Based upon this comparison, the audit server 150 can determine that a particular tag fired.

FIG. 5 also shows that the method can comprise act 530 of recording information. Act 530 includes recording information associated with the particular tag. For example, FIG. 3 depicts a summary report that the reporting module of FIG. 1 can generate.

As yet another additional or alternative implementation, FIG. 6 illustrates that a method for auditing mobile applications can include an act 600 of intercepting a communication. Act 600 can comprise intercepting, with an application interface layer, a network communication. The network communication can originate from the target mobile application. Additionally, the application interface layer can be installed on a desktop computer, and the target mobile application can be installed within the application interface layer. For example, in FIG. 2, the target mobile application 100 can generate a network communication 160. The network communication 160 can be intercepted by the application interface layer 210, which is installed on the desktop computer 200. The application interface layer 210 may comprise a simulator, an emulator, or a similar application configured to execute mobile applications.

FIG. 6 shows that the method can also include act 610 of analyzing the communication. Act 610 can comprise analyzing the network communication to determine if an identifiable tag signature is present within the network communication. An identifiable tag signature can comprise one or more attributes that are associated with the firing of a tag. For example, in FIG. 2, application interface layer 210 can analyze network communication 235. In particular, the application interface layer 210 analyzes the network communication 235 locally on the desktop computer 200.

Additionally, FIG. 6 shows that the method can include act 620 of determining a tag fired. Act 620 can comprise, based upon a detected tag signature, determining that a particular tag fired. For example, in FIG. 2, the application interface layer 210 can identify various attributes relating to network communication 160. The application interface layer 210 can then compare these attributes to tag signatures stored in a database accessible to the application interface layer 210. Based upon this comparison, application interface layer 210 can determine that a particular tag fired.

FIG. 6 also shows that the method can comprise act 630 of recording information. Act 630 includes recording information associated with the particular tag. For example, FIG. 3 depicts a summary report that can be generated by the mobile auditing application 125.

Accordingly, one or more implementations of the present invention allow a user to audit tags associated with mobile applications. Additionally, in various implementations, a user is able to audit mobile applications using a variety of different systems and configurations. Implementations of the present invention provide significant improvements within the technical field of tag auditing. For example, implementations of the present invention allow tags fired by a mobile application to be analyzed—something that was not previously possible within the field. Additionally, implementations of the present invention improve the performance of a computer system by allowing for an automated auditing system to ensure that tags are efficiently and correctly firing.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment.

Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computerized environment comprising a mobile device and a mobile auditing application in communication with a network, a method of the mobile auditing application auditing tags launched within a target mobile application, the method comprising the acts of:
   intercepting, with the mobile auditing application, a network communication as it is generated, and prior to transferring the network communication to the network, wherein:
      the network communication originates from the target mobile application, and
      the mobile auditing application and the target mobile application are both installed on the mobile device;
   analyzing the network communication to determine if an identifiable tag signature is present within the network communication, wherein an identifiable tag signature comprises one or more attributes that are associated with the firing of a tag;
   based upon a detected tag signature, determining that a particular tag fired; and
   recording information associated with the particular tag.

2. The method as recited in claim 1, wherein the target mobile application is configured to allow a user to browse specific webpages.

3. The method as recited in claim 1, further comprising displaying a summary of the recorded information.

4. The method as recited in claim 3, wherein the summary of the recorded information comprises a display of expected tags and detected tags.

5. The system of claim 1, wherein determining if an identifiable tag signature is present within the network communication comprises:
   analyzing a URL associated with the network communication; and
   determining that the URL comprises a portion of text that is associated with the particular tag.

6. The system of claim 1, wherein determining if an identifiable tag signature is present within the network communication comprises:
   analyzing a destination of the network communication; and
   determining that the destination is associated with the particular tag.

7. In a computerized environment comprising an auditing system and a mobile application in communication with a network, a method of the auditing system auditing tags launched within the mobile application, the method comprising the acts of:
   directing, through a proxy server, an intercepted network communication, wherein the network communication originates from a target mobile application installed on a mobile device;
   analyzing the network communication to determine if an identifiable tag signature is present within the network communication, wherein an identifiable tag signature comprises one or more attributes that are associated with the firing of a tag;
   based upon a detected tag signature, determining that a particular tag fired; and
   recording information associated with the particular tag.

8. The method as recited in claim 7, wherein a mobile auditing application, which is installed on the mobile device, automatically configures the mobile device such that the target mobile application communicates with the proxy server.

9. The method as recited in claim 7, further comprising:
   receiving an indication of a user input;
   determining an expected tag based upon the user input; and
   comparing the particular tag with the expected tag.

10. The method as recited in claim 9, further comprising displaying a summary of the recorded information.

11. The method as recited in claim 10, wherein the summary of the recorded information comprises a display of expected tags and detected tags.

12. The system of claim 7, wherein determining if an identifiable tag signature is present within the network communication comprises:
   analyzing a URL associated with the network communication; and
   determining that the URL comprises a portion of text that is associated with the particular tag.

13. The system of claim 7, wherein determining if an identifiable tag signature is present within the network communication comprises:
   analyzing a destination of the network communication; and determining that the destination is associated with the particular tag.

14. In a computerized environment comprising an application interface layer and a target mobile application in communication with a network, a method of the application interface layer auditing tags launched within the target mobile application, the method comprising the acts of:
- intercepting, with the application interface layer, a network communication as it is generated, and prior to transferring the network communication to the network, wherein:
  - the network communication originates from the target mobile application,
  - the application interface layer is installed on a desktop computer,
  - the target mobile application is installed within the application interface layer, and
  - the target mobile application behaves as if it is installed on a mobile device;
- analyzing the network communication to determine if an identifiable tag signature is present within the network communication, wherein an identifiable tag signature comprises one or more attributes that are associated with the firing of a tag;
- based upon a detected tag signature, determining that a particular tag fired; and
- recording information associated with the particular tag.

15. The method as recited in claim 14, wherein the application interface layer comprises a mobile device simulator.

16. The method as recited in claim 14, wherein the application interface layer comprises a mobile device emulator.

17. The method as recited in claim 14, wherein the application interface layer captures a user input.

18. The method as recited in claim 17, further comprising:
determining an expected tag based upon the user input; and
comparing the particular tag with the expected tag.

19. The method as recited in claim 18, further comprising displaying a summary of the recorded information.

20. The method as recited in claim 19, wherein the summary of the recorded information comprises an indication of the expected tag and the particular tag.

* * * * *